(12) United States Patent
Mimnagh et al.

(10) Patent No.: US 7,362,673 B2
(45) Date of Patent: Apr. 22, 2008

(54) OPTICAL RECORDING METHOD AND APPARATUS USING THIS METHOD

(75) Inventors: Winslow Mi Mimnagh, Eindhoven (NL); Johannes Hendrikus Maria Spruit, Eindhoven (NL); Arie J. Den Boef, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/536,029

(22) Filed: Sep. 28, 2006

(65) Prior Publication Data

US 2007/0019524 A1 Jan. 25, 2007

Related U.S. Application Data

(63) Continuation of application No. 11/023,026, filed on Dec. 23, 2004, now Pat. No. 7,123,563, which is a continuation of application No. 10/685,246, filed on Oct. 14, 2003, now abandoned, which is a continuation of application No. 08/982,564, filed on Dec. 2, 1997, now abandoned, which is a continuation-in-part of application No. 08/976,520, filed on Nov. 21, 1997, now Pat. No. 6,134,209, which is a continuation-in-part of application No. 08/759,653, filed on Dec. 6, 1996, now Pat. No. 5,793,737.

(30) Foreign Application Priority Data

Dec. 24, 1996 (EP) .................................. 96203718

(51) Int. Cl.
G11B 7/00 (2006.01)
(52) U.S. Cl. .................................. 369/47.51; 369/47.53

(58) Field of Classification Search ................ 369/116, 369/275.3, 47.5, 47.51, 47.52, 47.53
See application file for complete search history.

(56) References Cited

U.S. PATENT DOCUMENTS

| 4,901,300 A | 2/1990 | Van Der Zande |
| 5,070,495 A | 12/1991 | Bletscher, Jr. |
| 5,185,733 A | 2/1993 | Finkelstein |
| 5,187,699 A | 2/1993 | Raaymakers |
| 5,226,027 A | 7/1993 | Bakx |
| 5,268,893 A | 12/1993 | Call |
| 5,303,217 A | 4/1994 | Bakx |
| 5,341,360 A | 8/1994 | Johann |
| 5,418,770 A | 5/1995 | Ide |
| 5,463,600 A | 10/1995 | Kirino |

(Continued)

FOREIGN PATENT DOCUMENTS

| EP | 0397238 A1 | 11/1990 |
| EP | 0737962 A2 | 10/1996 |
| EP | 0762399 A1 | 12/1997 |

*Primary Examiner*—Nabil Hindi
(74) *Attorney, Agent, or Firm*—Michael E. Belk

(57) ABSTRACT

Optical recording method and apparatus using this method.

Figure 1:
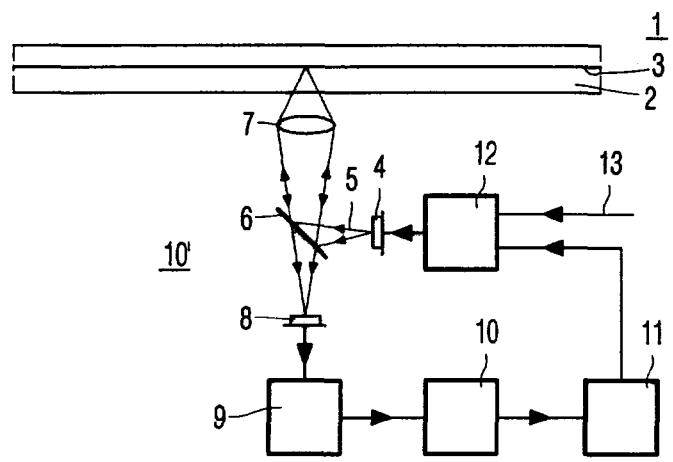

An optical recording method and recording apparatus using this method is described in which an optimum write power of a radiation beam in the apparatus is set by writing a series of test patterns on an optical recordable medium, forming a read signal from the patterns, reading a preset value of the derivative of the modulation of the read signal with respect to the write power from the medium, and processing the read signal together with the preset value to derive an optimum value of the write power.

15 Claims, 3 Drawing Sheets

U.S. PATENT DOCUMENTS

| | | |
|---|---|---|
| 5,544,137 A | 8/1996 | Ohara |
| 5,617,399 A | 4/1997 | Spruit |
| 5,654,947 A | 8/1997 | Roth |
| 5,687,156 A | 11/1997 | Hurst |
| 5,703,841 A | 12/1997 | Hiroki |
| 5,737,289 A | 4/1998 | Udagawa |
| 5,745,463 A | 4/1998 | Maegawa |
| 5,815,477 A | 9/1998 | Kimura et al. |
| 5,862,103 A | 1/1999 | Matsumoto et al. |
| 5,872,763 A | 2/1999 | Osakabe |
| 6,134,209 A | 10/2000 | Den Boef |

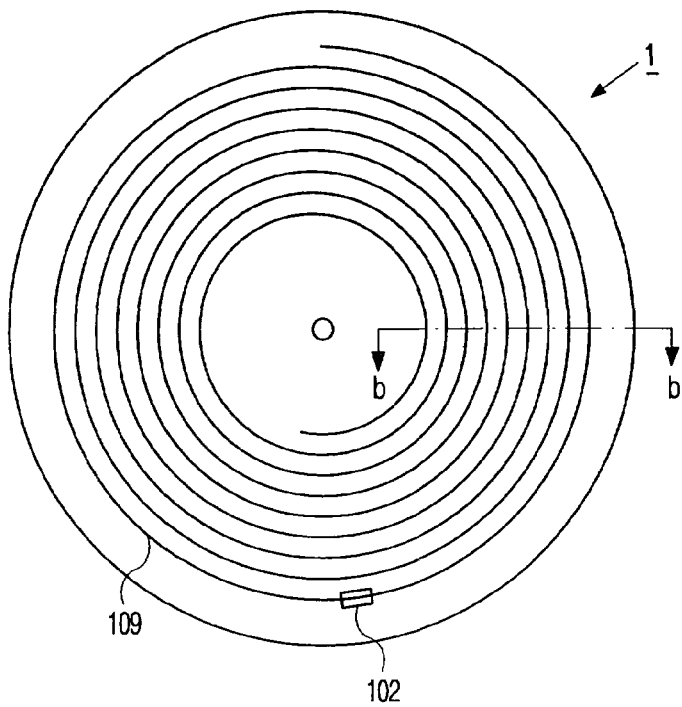
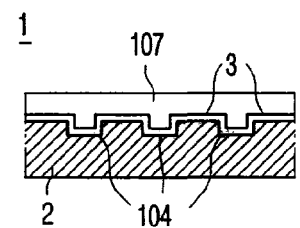
FIG. 4b
FIG. 4a
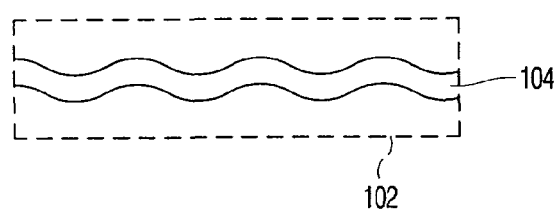
FIG. 4c
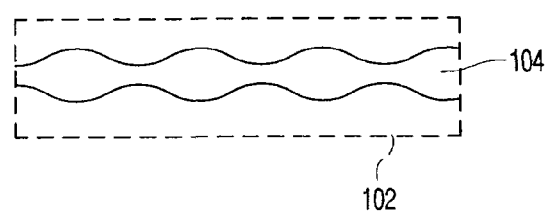
FIG. 4d

OPTICAL RECORDING METHOD AND APPARATUS USING THIS METHOD

The invention relates to a method for writing information on an optical recording medium by a radiation beam. The method is used for setting an optimum value of a write parameter and comprises a first step of writing a series of test patterns on the recording medium, each pattern with a different value of the write parameter, a second step of reading the patterns to form corresponding read signals, a third step of deriving a value of a read parameter from each read signal, the values forming a function of the read parameter versus the write parameter, and a fourth step of selecting the optimum value of the write parameter in dependence on a preset value of a derivative of the function. The invention also relates to an apparatus for writing information on an optical recording medium, comprising a radiation source for emitting a radiation beam in dependence on a controllable value of a write parameter for writing information on the medium, a control unit for writing a series of test patterns, each pattern with a different value of the write parameter, a read unit for reading the patterns and forming corresponding read signals, a first processor for deriving a value of a read parameter from each read signal, the values forming a function of the read parameter versus the write parameter, a second processor operatively connected for deriving an optimum value of the write parameter in dependence on a preset value of a derivative of the function.

A method and apparatus according to the first paragraph is known from European patent application no. EP-A 0 737 962. The apparatus uses a method for setting the optimum write power of the radiation beam having the following steps. First the apparatus records a series of test patterns on the medium, each pattern with increasing write power. Next, it derives the modulation of each pattern from a read signal corresponding to the pattern. It calculates the derivative of the modulation as a function of write power and normalises the derivative by multiplying it by the write power over the modulation. The intersection of the normalised derivative with a preset value determines a write power level suitable for recording on this medium. This procedure for setting the optimum write power takes the different characteristics of the media into account by measuring the modulation of test patterns written on the media. The method is independent of the specific recording apparatus used because of the normalised derivative employed in the procedure. The derivative is insensitive for apparatus parameters such as the numerical aperture of the objective lens for focusing the radiation beam on the medium, the intensity distribution over the radiation beam and the size of the spot formed by the radiation beam. These characteristics of the method are designed for providing a proper setting of the write power for each combination of recording apparatus and medium. However, experiments have revealed that the known method does not result in a proper write power level for all combinations of apparatuses and media.

It is a first object of the invention to provide a method that yields a proper write power level, independent of the apparatus and medium being used. It is a second object of the invention to provide an optical recording apparatus adapted for using this method.

The first object is achieved in accordance with the invention by an optical recording method as described in the opening paragraph, which is characterized in that the fourth step includes reading the preset value from the medium. The improper write power levels in the above experiments were due to an unexpected dependence of the preset level on properties of the media to be recorded. Whereas all media properties were supposed to be characterized by the read signals from the test patterns, the derivative, used in order to be independent of apparatus properties, turns out to be dependent on media properties. It has been found that compatibility between apparatuses and media with regard to setting an optimum write parameter level by the above derivative method can only be achieved when the preset value of the derivative is recorded on the medium. The preset value is preferably recorded by the manufacturer of the medium. A user of the medium may also record the preset value after having performed sufficient tests on the medium.

The recorded preset value is preferably the preset value of the normalised derivative. The derivative is normalized by multiplying it by the ratio of the recording parameter over the read parameter. Whereas the use of the derivative makes the method insensitive to offsets present in the recording apparatus, the normalisation makes the method also insensitive to different scaling factors in different apparatuses. Such scaling factors may be influenced by the efficiency with which the optical system in the apparatus can generate a read signal from a series of recorded marks on the medium and the actual amplification of the read signal.

The derivative and the normalised derivative of the function may be determined in several ways. It is possible to determine the derivative by known numerical methods, e.g. by taking differences between the read parameter values and between the write parameter values and calculating their ratios or by the so-called Lagrange formula or n-point methods. Because the numerical methods magnify the noise present in the measured values, the derivative is preferably determined analytically from a function obtained by curve-fitting the read parameter values and write parameter values. When the function is available in analytical form, the derivative need not be calculated anymore, but the optimum value of the write parameter may be determined directly from the function and the preset value.

In a specific embodiment of the method according to the invention, the recording parameter is a value of a write power level of the radiation beam. The accurate setting of the write power level is of great importance for the quality of the resulting written marks. Other recording parameters may also be set to an optimum value by referring to a preset value of a derivative recorded on the medium, e.g. an erase power, bias power, the duration of a first, intermediate and last pulses of a series of pulses used for writing a mark on the medium and duty cycles of these pulses. If, for example, a series of test patterns is made with different duty cycle of the write pulses, the method enables the setting of an optimum duty cycle.

In a specific embodiment of the method, the read parameter is a modulation of the amplitude of a read signal derived from information recorded on the medium. The modulation can easily be derived from a read signal and it is a suitable parameter for optimizing write parameters. Other suitable read parameters are the reflection of the medium in recorded and unrecorded parts, and the number of errors in the information recovered from a series of specific test patterns or from a series of test patterns comprising random information, where the errors may be determined as bit errors or as byte errors.

The second object is achieved in accordance with the invention by an optical recording apparatus as described in the opening paragraph, which is characterized in that the apparatus comprises a read unit for reading the preset value from the medium, and in that an output of the read unit is connected to the second processor for transmitting the preset value.

The objects, features and advantages of the invention will be apparent from the following more particular description of preferred embodiments of the invention, as illustrated in the accompanying drawings.

Figure 2:
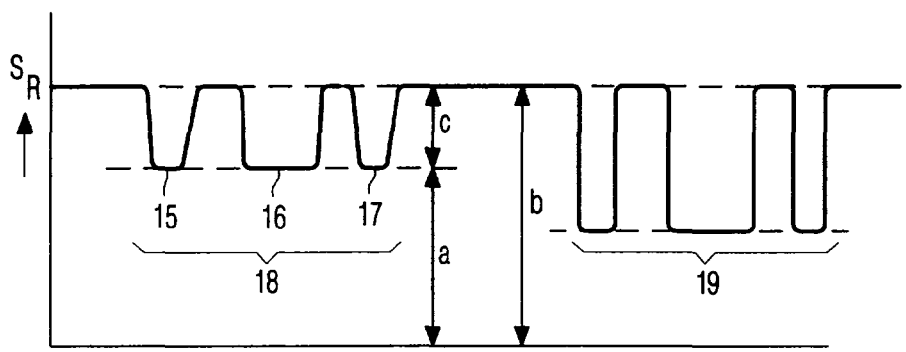
Figure 3:
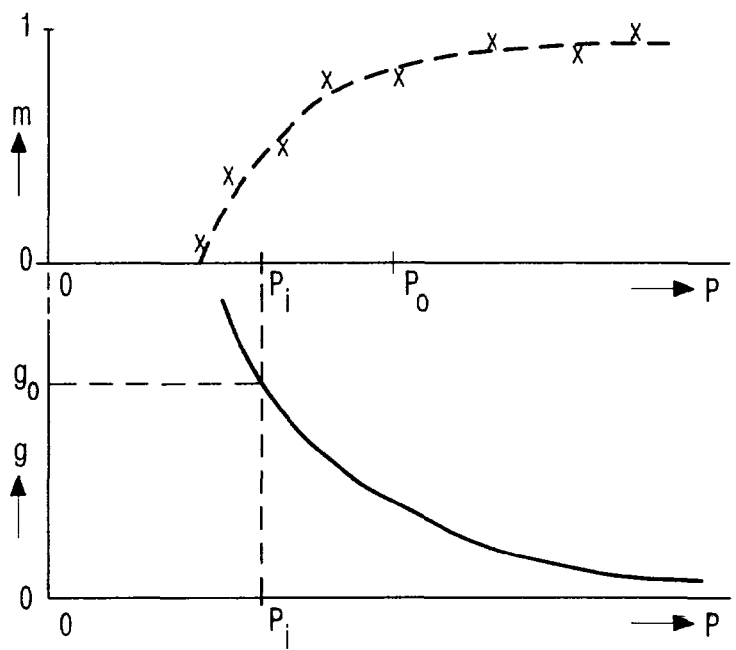
Figure 5:
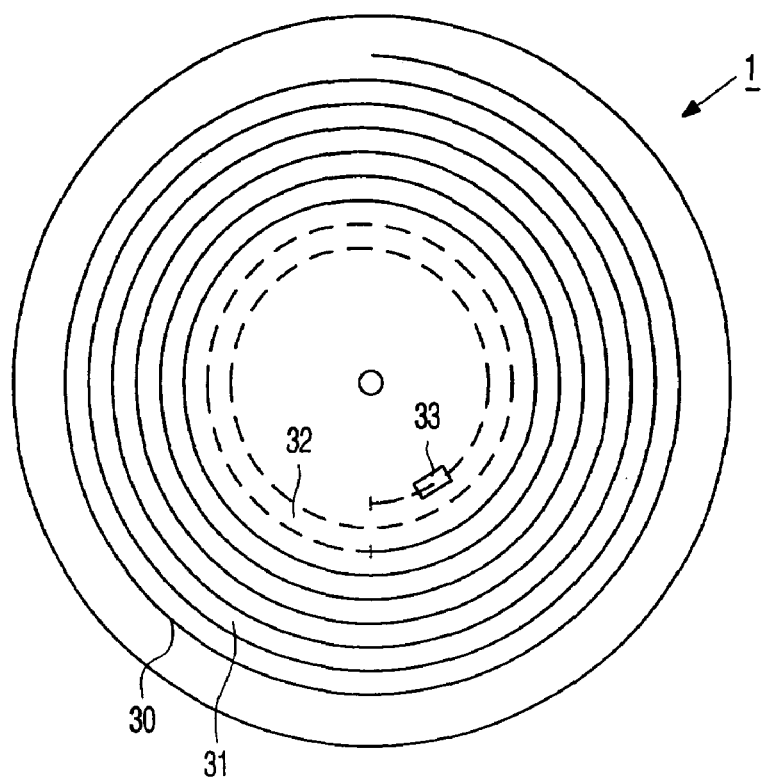
Figure 6:
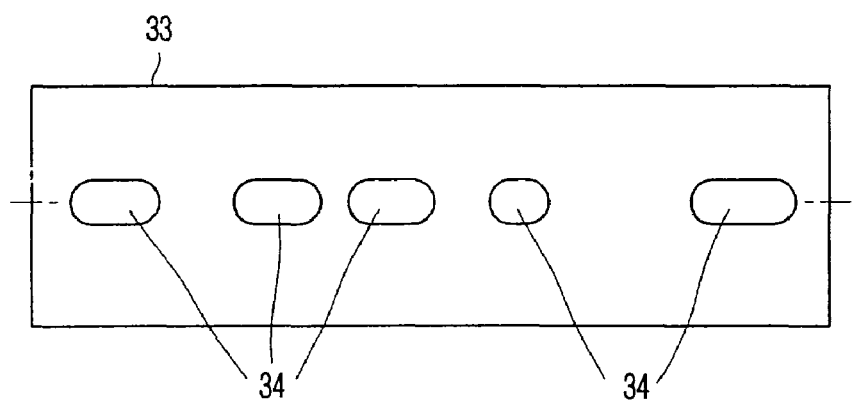

FIG. 1 is a diagram of an optical recording apparatus according to the invention, FIG. 2 illustrates two read signal portions from two test patterns, FIG. 3 is a graph showing the measured modulation as a function of write power and its derivative, FIG. 4 shows a recording medium according to the invention, FIG. 5 is a plan view of a recording medium, and FIG. 6 is a plan view of a pattern of marks in the medium.

FIG. 1 shows an apparatus and an optical recording medium 1 according to the invention. Medium 1 has a transparent substrate 2 and a recording layer 3 arranged on it. The recording layer comprises a material suitable for writing information by means of a radiation beam. The recording material may be of e.g. the magneto-optical type, the phase-change type, the dye type or any other suitable material. Information may be recorded in the form of optically detectable regions, also called marks, on recording layer 3. The apparatus comprises a radiation source 4, e.g. a semiconductor laser, for emitting a radiation beam 5. The radiation beam is converged on recording layer 3 via a beam splitter 6, an objective lens 7 and substrate 2. The medium may also be air-incident, where the radiation beam is directly incident on recording layer 3 without passing through a substrate. Radiation reflected from medium 1 is converged by objective lens 7 and, after passing through beam splitter 6, falls on a detection system 8, which converts the incident radiation in electric detector signals. The detector signals are input to a circuit 9. The circuit derives several signals from the detector signals, such as a read signal $S_R$ representing the information being read from medium 1. Radiation source 4, beam splitter 6, objective lens 7, detection system 8 and circuit 9 form together a read unit 10'. The read signal from circuit 9 is processed in a first processor 10 in order to derive signals representing a read parameter from the read signal and necessary for controlling the laser power level. The derived signals are fed in a second processor 11, which processes a series of values of the read parameter and based thereon derives a value for a write power control signal. The write power control signal is connected to a control unit 12. An information signal 13, representing the information to be written on medium 1, is also fed into control unit 12. The output of control unit 12 is connected to radiation source 4. A mark on recording layer 3 may be written by a single radiation pulse, the power of which is determined by the optimum write power level as determined by processor 11. A mark may also be written by a series of radiation pulses of equal or different lengths and one or more power levels determined by the write power signal. A processor is understood to mean any means suitable for performing calculations, e.g. a micro-processor, a digital signal processor, a hard-wired analog circuit or a field-programmable circuit.

The actual radiation power emitted by radiation source 4 may be measured by a not-shown detector arranged in an otherwise not-used side lobe of the radiation beam or in radiation reflected off an element in the optical path of the radiation beam. The signal of the detector may be connected directly to processor 11. Alternatively, the signal may be connected to control unit 12, where it may be combined with the peak amplitude of the read signal, to form a measure for the radiation power received at recording layer 3, and subsequently fed into processor 11.

Before writing information on medium 1 the apparatus sets its write power to the optimum value by performing the following procedure. First the apparatus writes a series of test patterns on medium 1. The test patterns should be selected so as to give a desired read signal. If the read parameter to be derived from the read signal is the maximum modulation of a read signal portion pertaining to a test pattern, the test pattern should comprise marks sufficiently long to achieve a maximum modulation of the read signal portion. When the information is coded according to the so-called eight-to-fourteen modulation (EFM), the test patterns preferably comprise the long $I_{11}$ marks of the modulation scheme. The test patterns are recorded each with a different write power. The range of the powers may selected on the basis of an indicative power level recorded as control information on the medium. Subsequent patterns may be written with a step-wise increased write power under the control of processor 11. The patterns may be written anywhere on the medium. They may also be written in specially provided test areas on the medium.

FIG. 2 shows the read signal portions 18 and 19 obtained from two patterns written at two different write power levels. The drawn patterns comprise a short mark, a long mark and a short mark, as shown by the signal parts 15, 16 and 17, respectively in both read signal portion 18 and read signal portion 19. An actual pattern may comprise a few hundred marks of different or equal lengths.

Processor 10 derives from the read signal $S_R$ a read parameter to be used for determining the optimum write power. A possible read parameter is the ratio of the lowest amplitude of a read signal portion, for read signal portion 18 indicated by 'a' in FIG. 2, and the maximum amplitude of the same read signal portion, indicated by 'b'. A preferred read parameter is the normalised modulation, being the ratio of the maximum peak-to-peak value of a read signal, indicated by 'c', and the maximum amplitude 'b' of the read signal portion.

After reading the test patterns on medium 1, processor 11 forms a series of value pairs for the modulation of a pattern and the write power with which that pattern has been written. The write powers may be taken from the value of the write power control signal during recording the test patterns, or from a measurement of the radiation power. FIG. 3 shows schematically the result of the processed read signal obtained from the test patterns; each cross represents a pair of values for the modulation m and the write power P of a test pattern, the crosses together forming a function of the modulation m versus the write power P. Processor 11 fits a curve through the measured modulation values in order to obtain an analytic expression for the variation of the modulation as a function of the write power. The curve is indicated in FIG. 3 by a dashed curve. The fitting may be done by the well-known least-squares fitting algorithm. The fitted curve is described by the function m(P).

As a next step, processor 11 calculates analytically a normalised derivative of the function m(P) with respect to the write power P. The normalised derivative g(P) is equal to the function (dm/dP)P/m. The function g derived from the fitted modulation m in FIG. 3 is shown by the drawn curve.

Next, the processor derives an intermediate write power $P_i$ from the normalised derivative. To this end it reads a preset value $g_0$ from the medium and determines the value of the write power P belonging to the preset value as indicated by the dashed lines in the lower half of FIG. 3. The value of $g_0$ may be a value set by the manufacturer of the recording medium and stored on the medium. As a next step, the value of the intermediate power $P_i$ is multiplied by a constant h larger than one, resulting in the optimum write power level $P_0$.

The values of the preset value $g_0$ and the multiplication constant h are determined by the manufacturer of the medium or by the user during initialisation of the medium and stored on the medium. The value of $g_0$ is set within a range from 0.2 to 5.0. For values higher than 5.0 the normalised derivative looses its predicting value, because the proximity of an asymptote may cause the values of P related to $g_0$ to lie closely together on the write power axis. The increased measurement error in the derivative is another reason to avoid values of $g_0$ larger than 5.0. For values of $g_0$ lower than 0.2 the normalised derivative has a small slope, through which small errors in the value of the derivative result in a large spread of the values of $P_i$ associated with $g_0$. Experiments on rewritable recording media having a CD format gave values of $g_0$ in a range from 0.5 to 2.0, and on media having a higher density in a range from 2.0 to 4.0. The multiplication constant h is set preferably within a range from 1.00 to 1.35 and is also recorded on the medium. The optimum write power $P_0$, equal to ($hP_i$), is in general set to a value near the write power where the modulation m starts saturating. An optimum erase power may be derived from the optimum write power by taking the optimum erase power $P_e$ equal to ($kP_0$), with k a multiplication constant. The constant k may be recorded on the medium and lies preferably within the range 0.40 to 0.66.

In a preferred method of setting $g_0$ and h, the optimum write power of a specific medium is determined by finding the write power which gives the lowest jitter of the read signal from information written on the medium. The information is preferably random information. Next, the normalised derivative dm/dP (P/m) is determined from a written series of test patterns as described above. A value for $g_0$ is selected which lies within the above range, i.e. where the normalised derivative is neither too flat nor too steep. The associated value of $P_i$ is determined by the normalised derivative. The value of h is now equal to $P_0/P_i$. These values of $g_0$ and h can be recorded on all media of the same type, i.e. made by the same production process, for use in all recording apparatuses. In general, different types of media, e.g. media from different manufacturers, have different recorded values of $g_0$ and, if necessary, also different recorded values of h. If for a certain application the value of h is fixed and is not recorded on the medium, the value of $g_0$ to be recorded should be selected such that the associated value of $P_i$ multiplied by the fixed value of h results in the optimum write power $P_O$.

The value of the normalised derivative turns out to be hardly affected by variations of parameters of the recording apparatus. If the optimum write power level is selected in dependence on the normalised derivative, the selected level is suitable for reliable recording on a large variety of recording media by different recording apparatuses. The write power level may be selected by taking the power level corresponding to a preset value of the normalised derivative. The advantages of the use of the normalised derivative may also be achieved when no curve-fitting is performed. In that case the derivative may be determined from the read parameter versus write power level data by e.g. calculating differences between the measured values. However, omitting the step of curve-fitting will increase the noise in the values of the derivative, thereby thwarting the use of the derivative for setting the optimum write power for some media.

The function to be fitted through the pairs of values (m,P) may be one or more polynomials, which are preferably orthogonal. The curve may then be written as:

$$m(P) = \sum_i a_i f_i(P) \qquad (1)$$

The normalised derivative is given in the analytic form $$g(P) = \frac{P \sum_i a_i f_i'(P)}{\sum_i a_i f_i(P)} \qquad (2)$$

where f'(P) is the derivative of function f with respect to the parameter P. The value of $P_i$ can be found from the equation $$g(P_i) = g_0 \qquad (3)$$

Depending on the choice of the curve to be fitted, the value of $P_i$ can be found in the form of an analytic expression or as the result of a numerical successive root approximation method such as the regula falsi or Newton's method. The use of an analytic expression, when possible, has the advantage that it provides the correct root, whereas a successive approximation may divert to an undesired root of the equation. When an analytic form of equation (3) can be found, the normalised derivative g need not be determined anymore, but the preset value $g_0$ may be inserted directly into equation (3) for determining the associated value of $P_i$.

A suitable set of orthogonal polynomials $f_i$ are the Legendre polynomials. The four lowest order Legendre polynomials are given by:

$$f_0(P) = 1 \qquad (4)$$
$$f_1(P) = P$$
$$f_2(P) = \frac{3}{2}P^2 - \frac{1}{2}$$
$$f_3(P) = \frac{5}{2}P^3 - \frac{3}{2}P$$

Since these polynomials are defined on the interval $-1 < P < +1$ and the write powers are taken from a range $P_{min}$ to $P_{max}$, the write power values to be fitted should be scaled according to $$P_s = \frac{2P - (P_{max} + P_{min})}{P_{max} - P_{min}} \qquad (5)$$

The scaled write power levels $P_s$ must now be used in the formulae of equation (4). The value of $P_i$ found from equation (3) must be scaled back to the range $P_{min}$, $P_{max}$.

When using a digital processor, the input values of m and P must be converted from an analog value to a digital value by an analog-to-digital convertor. The number of bits of the digital output values can be made to correspond to the noise in the measured values. If, for example, the noise in the values of a parameter is 1% of the maximum value of the parameter, the convertor should be at least 8 bits deep, thereby introducing an additional $\frac{1}{2}^8 = \frac{1}{256}$ quantization noise.

If processor 11 in which the above calculations are made is a small processor for reason of costs, the calculations are preferable performed in an integer format. The values of m and P should therefore be converted from real to integer values. The multiplication constant for this conversion should be large enough not to introduce additional noise and small enough not to require too require much computing power. A good guide is to choose the constant such that the noise present in the value of m or P, as determined in the integer representation of the value, is slightly larger than the value corresponding to the least significant bit in the integer representation. The noise in the value includes the above-mentioned quantisation noise. If, for example, the noise in the values of m is 0.5% of the maximum value of m, then a multiplication factor of about 1000 divided by the maximum value of the parameter is reasonable.

Instead of using a series of polynomials for fitting the values of m and P, a single function may also be used. The function preferably has an asymptote for large values of P. It should have several parameters the values of which are to be determined by the curve-fitting. The function should have parameters for the value of the function at small values of P, for the derivative of the function at intermediate values of P and for the value of the function at larger values of P. A suitable function is $$f(P) = a_0 - \frac{a_1}{P - a_2} \quad (6)$$

The normalised derivative can be given in an analytic form. Equation (4) reduces then to a quadratic equation, allowing to find the root without successive approximation.

Other suitable functions are the arc tangent and the hyperbolic tangent:

$$f(P) = a_0 \, arc \, \tan(a_1 P - a_2) \quad (7)$$

$$f(P) = a_0 \tan h(a_1 P - a_2). \quad (8)$$

The values of the arc tangent and the hyperbolic tangent may be stored in a look-up table to speed up the calculations.

FIG. 4a shows disc-shaped recording medium 1 according to the invention. The recording medium has a continuous track 109 intended for recording, which is arranged in a helical pattern of windings. The windings may also be arranged concentrically instead of helically. The location of track 109 on the recording medium is indicated by a servo pattern, for example in the form of a pregroove 104, which enables a read/write head to follow track 109 during scanning. Alternatively, a servo pattern may be, for example, uniformly distributed sub-patterns which periodically cause signals to develop in a servo tracking system. FIG. 4b shows a section along line b-b of recording medium 1, in which substrate 2 is covered by recording layer 3 and a layer 107 and the cross-section of three grooves 104 is visible. Pregroove 104 may also be formed as a raised part of the substrate or as a material having a property differing from its surroundings. The recording layer 3 can be inscribed optically or magneto optically by an recording apparatus. Information on the recording medium is represented by patterns of marks. Information is recorded in track 109 by a recording process in which each mark is formed by one or more recording pulses of constant or varying write power depending on, for example, the length of the mark. The recording parameters of the recording process, such as the write power, the number of pulses, the variation and the duty cycle, are to be tuned to the recording medium, in particular to the material properties of this recording medium. An example of an inscribable record carrier is the known CD Write Once or CD-MO for computer-use. An extensive description of the inscribable CD system that similarly comprises information, may be found in U.S. Pat. No. 4,901,300 (PHN 12.398) and U.S. Pat. No. 5,187,699 (PHQ 88.002). A description of the reading of a CD and the use of a pregroove portion can be found in the book "Principles of optical disc systems" by Bouwhuis et al., ISBN 0-85274-785-3.

FIGS. 4c and 4d each show an enlarged section 102 of medium 1 comprising a specific embodiment of a groove having a periodic modulation (wobble). This wobble causes an additional signal to arise in a servo tracking pick-up. The wobble is, for example, frequency-modulated with an auxiliary signal and information is coded in the auxiliary signal. A description of a recording medium having such information recorded in the groove may be found in EP-A 0 397 238. The pregroove is very suitable for recording control information indicative of the recording process. Recording media of a different type, such as, for example, an optical tape, may be provided with control information in a different manner, for example, by arranging a control area at the beginning of the tape or along an auxiliary track.

When the medium is read at the nominal speed for a CD-type medium, the additional signal from the pregroove has a frequency of 22.05 kHz frequency modulated with a 1 kHz deviation. After FM demodulation and digitization, a bitstream having a bit rate of 3150 bits/s results. The bitstream is divided in frames of 42 bits each, each frame comprising 4 synchronization bits, 24 information bits and 14 error correction bits, in this order. The contents of the information stored in a frame depend on the position of the frame in the bitstream. In a group of ten frames nine consecutive frames comprise a timecode called ATIP (absolute time in pregroove), to be used as address for accessing user information on the medium. The tenth frame out of the group of ten frames comprises control information. Three consecutive control information frames, spaced by nine timecode frames, comprise an indicative value for the power $P_i$, a value for the multiplication factor h, a value for the normalised derivative $g_0$ and a value for the multiplication constant k. The frames comprising control information are preferably located prior to an area used for recording user information, e.g. the lead-in area of a CD-type medium.

FIG. 5 shows another embodiment of recording medium 1, provided with a track 30. The track may be circular or spiral and in the form of for example an embossed groove or ridge. The area of the medium is divided in an information recording area 31 for writing user information and a control area 32 for storing information relevant for writing, reading and erasing information on the medium and in general not intended for recording user information. Control area 32 is marked by a dashed track in the Figure. Information recording area 31 is of a type which is subject to change in an optically detectable property when exposed to radiation above a specific write power level. The value of $g_0$ may be stored as a pattern of control information in control area 32 of the medium. When the control area is embossed, the manufacturer of the medium must record the value. Alternatively, the user may record the value in the medium during for instance initialisation of the medium, allowing the recording of a disc-specific value. The values of h and k may also be recorded like the value of $g_0$. FIG. 6 shows a strongly enlarged portion of track 33 comprising a pattern of marks 34 in which the control information is encoded.

Although the invention has been explained by an embodiment using the write power as recording parameter and the read signal modulation as read parameter, it will be clear that other combinations of recording and read parameter can be employed in the invention. For example, a specific timing of the pulse pattern used for recording a mark can be used as recording parameter and the jitter of the read signal as the read parameter.

The invention claimed is:

1. An apparatus for setting a write parameter for writing information on an optical recording medium by a radiation beam, the apparatus comprising:
   a first processor portion configured to control writing a series of test patterns on the recording medium, the test patterns comprising a plurality of different values of a write parameter; and
   a second processor portion operatively coupled to the first processor portion and configured to receive a read signal based on reading the written test patterns, and to form corresponding read signal portions, wherein the first processor portion is configured to derive a value of a read parameter from each read signal portion, the values forming a function of the read parameter versus the write parameter, and is configured to select an optimum value of the write parameter in dependence on a preset value of a derivative of the function, wherein the preset value is received from the recording medium.

2. The apparatus of claim 1, wherein the derivative is a normalized derivative, wherein the first processor portion is configured to determine the normalized derivative by multiplying the derivative of the function with respect to the write parameter and then multiplying by a ratio of the read parameter and the write parameter.

3. The apparatus of claim 1 or 2, wherein the first processor portion is configured to select the optimum value of the write parameter by determining a derivative of the function and by determining the intersection of the derivative with the preset level.

4. The apparatus of claim 1 or 2, wherein the first processor portion is configured to derive the value of the read parameter by curve-fitting the values of the read parameter and the write parameter to the function defining a relation between the read parameter and the write parameter.

5. The apparatus of claim 1 or 2, wherein the write parameter is a value of a write power level of a radiation beam.

6. The apparatus of claim 1 or 2, wherein the read parameter is a modulation of the amplitude of a read signal derived from information recorded on the medium.

7. An apparatus for writing information on an optical recording medium in dependence on a controllable value of a write parameter for writing information on the medium, the apparatus comprising:
   a first processor portion configured to control writing of a plurality of test patterns, each pattern having a different value of the write parameter; and
   a second processor portion operatively coupled to the first processor portion and configured to receive a reading of the patterns and form corresponding read signals, for deriving a value of a read parameter from each read signal, the values forming a function of the read parameter versus the write parameter, wherein the first processor portion is configured to receive the function from the second processor portion and is configured to derive an optimum value of the write parameter in dependence on a preset value of a derivative of the function, wherein the second processor portion is configured to receive the preset value from the medium.

8. The apparatus of claim 7, wherein the second processor portion is configured to derive a derivative of the function and to determine an intersection of the derivative and the preset value.

9. The apparatus of claim 7, wherein the derivative is a normalized derivative formed by multiplying the derivative by the write parameter over the read parameter.

10. The apparatus of claim 7, wherein the write parameter is a write power level of the radiation beam.

11. The apparatus of claim 7, wherein the read parameter is an amplitude of a read signal.

12. The apparatus of claim 7, wherein the first processor portion is configured to control writing the series of test patterns to have a step-wise increasing write power.

13. The apparatus of claim 7, wherein the preset value is a value in a range of 0.2 to 5.0.

14. The apparatus of claim 7 or 8, wherein the preset value includes a multiplication constant and wherein the first processor portion is configured to derive an intermediate power value in dependence on the preset value of the derivative of the function, and is configured to multiply the intermediate value by the multiplication constant to derive the optimum value.

15. The apparatus of claim 14, wherein the multiplication constant is a value in a range of 1.00 to 1.35.

* * * * *